US012697918B2

(12) United States Patent
Muramatsu et al.

(10) Patent No.: US 12,697,918 B2
(45) Date of Patent: Aug. 4, 2026

(54) VEHICLE LAMP SYSTEM, LIGHT DISTRIBUTION CONTROLLING DEVICE, AND LIGHT DISTRIBUTION CONTROLLING METHOD

(71) Applicant: Koito Manufacturing Co., Ltd., Tokyo (JP)

(72) Inventors: Takao Muramatsu, Shizuoka (JP); Yuta Maruyama, Shizuoka (JP); Yuichi Watano, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 35 days.

(21) Appl. No.: 18/887,137

(22) Filed: Sep. 17, 2024

(65) Prior Publication Data

US 2025/0010786 A1     Jan. 9, 2025

Related U.S. Application Data

(63) Continuation of application No. PCT/JP2023/007651, filed on Mar. 1, 2023.

(30) Foreign Application Priority Data

Mar. 22, 2022     (JP) ................................. 2022-045931

(51) Int. Cl.
*B60Q 1/14* (2006.01)
*F21S 41/663* (2018.01)
*F21W 102/135* (2018.01)

(52) U.S. Cl.
CPC .......... *B60Q 1/1415* (2013.01); *F21S 41/663* (2018.01); *B60Q 2300/054* (2013.01); *F21W 2102/135* (2018.01)

(58) Field of Classification Search
CPC .......... B60Q 1/12; B60Q 1/1415; F21S 41/43; F21S 41/148; F21S 41/153; F21S 41/663
See application file for complete search history.

(56) References Cited

U.S. PATENT DOCUMENTS

2006/0239204 A1 * 10/2006 Bordonaro .............. H04L 69/16
370/253
2008/0084165 A1     4/2008 Otsuka et al.
(Continued)

FOREIGN PATENT DOCUMENTS

EP      1875124 B1     10/2018
EP      3550204 A1     10/2019
(Continued)

OTHER PUBLICATIONS

International Preliminary Report on Patentability (Form PCT/IB/373) and the Written Opinion of the International Searching Authority (Form PCT/ISA/237) issued on Sep. 24, 2024, by the International Bureau of WIPO in corresponding International Application No. PCT/JP2023/007651. (9 pages).
(Continued)

*Primary Examiner* — Patrick C Chen
(74) *Attorney, Agent, or Firm* — BUCHANAN, INGERSOLL & ROONEY PC

(57) ABSTRACT

A vehicle lamp system includes a first light distribution variable lamp that forms a first light distribution pattern having a first hot zone, a second light distribution variable lamp that forms a second light distribution pattern outside the first light distribution pattern in a width direction of a vehicle, and a light distribution controlling device that controls the first light distribution variable lamp and the second light distribution variable lamp. The light distribution controlling device controls the first light distribution variable lamp and the second light distribution variable lamp so as to swivel the first hot zone within the first light (Continued)

distribution pattern and to form the second light distribution pattern outside the first light distribution pattern where the first hot zone swivels to.

13 Claims, 7 Drawing Sheets

(56)                    References Cited

U.S. PATENT DOCUMENTS

| | | |
|---|---|---|
| 2009/0231873 A1 | 9/2009 | Kotajima et al. |
| 2015/0377442 A1 | 12/2015 | Bhakta et al. |
| 2017/0232882 A1 | 8/2017 | Mochizuki |
| 2019/0299843 A1 | 10/2019 | Roels et al. |

FOREIGN PATENT DOCUMENTS

| | | | | |
|---|---|---|---|---|
| JP | 2000-168437 A | 6/2000 | | |
| JP | 2008094127 A | 4/2008 | | |
| JP | 2009220650 A | 10/2009 | | |
| JP | 2015230768 A | * 12/2015 | ............ | F21S 41/663 |

OTHER PUBLICATIONS

International Search Report (Form PCT/ISA/210) issued on Apr. 18, 2023, by the Japanese Patent Office in corresponding International Application No. PCT/JP2023/007651. (5 pages).
Extended European Search Report issued on Apr. 14, 2025, in corresponding European Patent Application No. 23774414.9. (8 pages).

* cited by examiner

VEHICLE LAMP SYSTEM, LIGHT DISTRIBUTION CONTROLLING DEVICE, AND LIGHT DISTRIBUTION CONTROLLING METHOD

CROSS-REFERENCE TO RELATED APPLICATIONS

This application is the continuation of International Patent Application No. PCT/JP2023/007651, filed on Mar. 1, 2023, which claims the benefit of priority from Japanese Patent Application No. 2022-045931, filed on Mar. 22, 2022, the entire content of each of which is incorporated herein by reference.

BACKGROUND

Field of the Invention

The present invention relates to vehicle lamp systems, light distribution controlling devices, and light distribution controlling methods.

Description of the Related Art

Vehicle lamps have been proposed in recent years that use a high-definition light source array in which light sources, such as LEDs, are arrayed in a matrix (see, for example, Patent Literature 1).

Patent Literature 1: JP 2008-094127

Typically, high beam light distribution patterns that vehicle lamps form include a portion called a hot zone that has a high illuminance or luminous intensity. Illuminating with a hot zone the part of the region ahead of the host vehicle where particularly high visibility is required can improve the visibility for the driver. If a vehicle lamp includes a light source array, a hot zone can be formed by creating a luminous intensity gradient among the light sources.

Meanwhile, in one known technique, when the driver's line of sight shifts from the front of the vehicle to the direction of turn, such as when the vehicle makes a turn, the optical axes of the vehicle lamps are swiveled in the direction of turn to increase the visibility of where the vehicle turns to. If a vehicle lamp includes a light source array, a hot zone in a high beam light distribution pattern can be swiveled in the direction of turn to increase the visibility of where the vehicle turns to, as with the case of swiveling the optical axes.

There exists a demand for expanding the range in which a hot zone can be swiveled to improve the visibility for drivers. However, high-definition light source arrays are generally expensive. Moreover, light source arrays do not dissipate heat easily as they have a structure in which a large number of light sources are densely arrayed. Due to these factors, it is desirable not to increase the size of a light source array.

SUMMARY OF THE INVENTION

The present invention has been made in view of such circumstances and is directed, in one aspect, to providing a technology for improving the visibility for a driver while avoiding an increase in the size of a light source array.

One aspect of the present invention provides a vehicle lamp system. This vehicle lamp system includes a first light distribution variable lamp that forms, in a region ahead of a vehicle, a first light distribution pattern having a first hot zone; a second light distribution variable lamp that forms a second light distribution pattern outside the first light distribution pattern in a width direction of the vehicle; and a light distribution controlling device that controls formation of light distribution patterns by the first light distribution variable lamp and the second light distribution variable lamp. The light distribution controlling device controls the first light distribution variable lamp and the second light distribution variable lamp so as to swivel the first hot zone within the first light distribution pattern and to form the second light pattern where the first hot zone swivels to.

Another aspect of the present invention provides a light distribution controlling device that controls formation of light distribution patterns by a first light distribution variable lamp and a second light distribution variable lamp, the first light distribution variable lamp forming, in a region ahead of a vehicle, a first light distribution pattern having a first hot zone, the second light distribution variable lamp forming a second light distribution pattern outside the first light distribution pattern in a width direction of the vehicle. This light distribution controlling device controls the first light distribution variable lamp and the second light distribution variable lamp so as to swivel the first hot zone within the first light distribution pattern and to form the second light distribution pattern outside the first light distribution pattern where the first hot zone swivels to.

Another aspect of the present invention provides a light distribution controlling method of controlling formation of light distribution patterns by a first light distribution variable lamp and a second light distribution variable lamp, the first light distribution variable lamp forming, in a region ahead of a vehicle, a first light distribution pattern having a first hot zone, the second light distribution variable lamp forming a second light pattern in a width direction of the vehicle. This light distribution controlling method includes controlling the first light distribution variable lamp and the second light distribution variable lamp so as to swivel the first hot zone within the first light distribution pattern and to form the second light distribution pattern outside the first light distribution pattern where the first hot zone swivels to.

It is to be noted that any combinations of the constituent elements above or an embodiment obtained by converting what is expressed by the present invention between a method, an apparatus, a system, and so forth is also valid as an aspect of the present invention.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
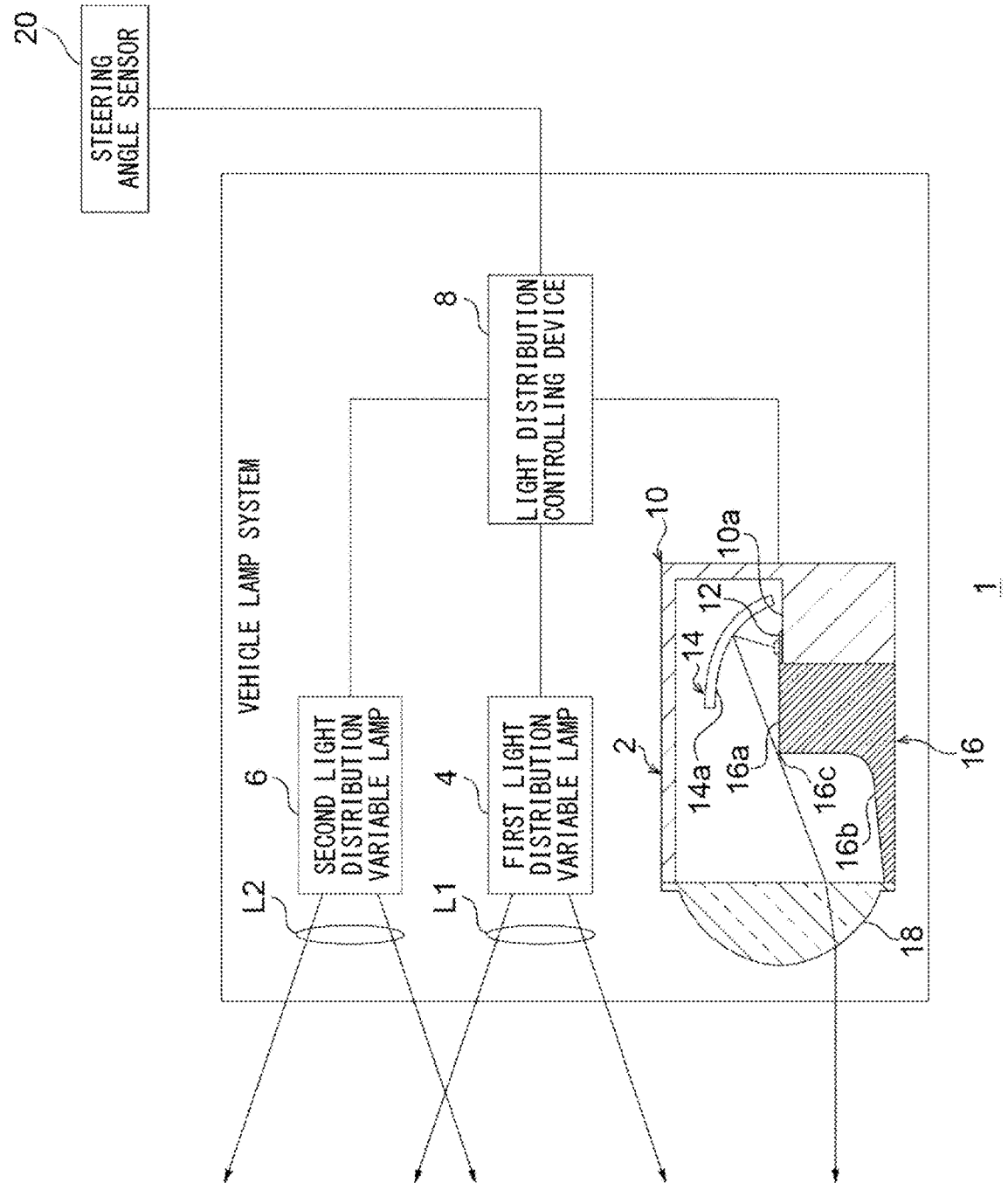
FIG. 1 shows a schematic configuration of a vehicle lamp system according to Embodiment 1.

Hereinafter, the present invention will be described based on exemplary embodiments and with reference to the drawings. The embodiments are illustrative in nature and are not intended to limit the invention. Not all the features and combinations thereof described in the embodiments are necessarily essential to the invention. Identical or equivalent constituent elements, members, and processes shown in the drawings are given identical reference characters, and their duplicate description will be omitted, as appropriate.

The scales and shapes of the components shown in the drawings are set merely for convenience in order to facilitate the description and are not to be interpreted as limiting, unless specifically indicated otherwise. When terms such as "first" and "second" are used in the present specification or in the claims, these terms do not indicate the order or the level of importance in any way and are merely used to distinguish a given component from another component, unless specifically indicated otherwise. Part of members that is not important in describing the embodiments is omitted from the drawings.

Embodiment 1

FIG. 1 shows a schematic configuration of a vehicle lamp system 1 according to Embodiment 1. FIG. 1 depicts some of the constituent elements of the vehicle lamp system 1 in the form of functional blocks. These functional blocks are implemented, in terms of their hardware configuration, by an element and/or circuit, including a CPU and a memory of a computer, or implemented, in terms of their software configuration, by a computer program or the like. It is to be appreciated by a person skilled in the art that these functional blocks can be implemented in a variety of forms through combinations of hardware and software.

The vehicle lamp system 1 includes a low beam lamp 2, a first light distribution variable lamp 4, a second light distribution variable lamp 6, and a light distribution controlling device 8. These members may be contained within a single housing, or one or more of these members may be provided outside such a housing. For example, the low beam lamp 2, the first light distribution variable lamp 4, the second light distribution variable lamp 6, and the light distribution controlling device 8 are housed in a lamp room. The lamp room is defined by a lamp body having an opening that opens to the front of the vehicle and a light-transmissive cover attached so as to cover the opening of the lamp body. The light distribution controlling device 8 may be provided outside the lamp room, such as in the vehicle. In this case, the light distribution controlling device 8 may be entirely or partly constituted by a vehicle ECU. Meanwhile, the low beam lamp 2, the first light distribution variable lamp 4, and the second light distribution variable lamp 6 may be entirely or partly housed in separate housings.

The low beam lamp 2 in one example includes a light source mounting portion 10, a light source 12, a reflector 14, a shade member 16, and a projection lens 18. The light source mounting portion 10 is formed, for example, of a metal material, such as aluminum, and is supported on the lamp body via a bracket (not shown). The light source mounting portion 10 has a light source mounting surface 10a. The light source mounting surface 10a according to the present embodiment extends in a substantially horizontal direction. The light source 12 is mounted on the light source mounting surface 10a.

The light source 12 is, for example, a light-emitting diode (LED). Herein, the light source 12 may instead, for example, be a semiconductor light source other than an LED, such as a laser diode (LD) or an organic or inorganic electroluminescence (EL) light source, an incandescent lamp, a halogen lamp, or a discharge lamp. The light source 12 emits light toward the reflector 14. The reflector 14 has a substantially dome-like shape. The reflector 14 is disposed so as to cover the light source 12 from directly above in the vertical direction and is fixed to the light source mounting portion 10. The reflector 14 has a reflective surface 14a formed by a part of a spheroidal surface. The reflective surface 14a has a first focal point and a second focal point that is located further to the front of the lamp than the first focal point. The positional relationship of the reflector 14 and the light source 12 is set such that the light source 12 substantially coincides with the first focal point of the reflective surface 14a.

The shade member 16 is fixed to the side of the light source mounting portion 10 that faces the front of the lamp. The shade member 16 includes a flat portion 16a extending substantially horizontally and a curved portion 16b located further to the front of the lamp than the flat portion 16a. The curved portion 16b is curved downward so as not to block the light source light from entering the projection lens 18. The positional relationship of the reflector 14 and the shade member 16 is set such that a ridge 16c formed by the flat portion 16a and the curved portion 16b is located near the second focal point of the reflective surface 14a. The projection lens 18 is fixed to the leading end of the curved portion 16b. The projection lens 18 is formed, for example, by a plano-convex aspherical lens and projects an inverted image of a light source image formed in its posterior focal plane onto an imaginary vertical screen ahead of the lamp. The projection lens 18 is disposed in the optical axis of the low beam lamp 2 such that the posterior focal point of the projection lens 18 substantially coincides with the second focal point of the reflective surface 14a.

Light emitted from the light source 12 is reflected by the reflective surface 14a, travels through the vicinity of the ridge 16c, and enters the projection lens 18. The light that has entered the projection lens 18 is projected into the region ahead of the lamp as substantially parallel light. At this point, the shade member 16 blocks part of the light source light from traveling ahead of the lamp. Specifically, part of the light emitted from the light source 12 is reflected by the flat portion 16a. In other words, the light from the light source 12 is selectively cut off at the ridge 16c serving as a boundary. Thus, a low beam light distribution pattern including a cutoff line corresponding to the shape of the ridge 16c (see FIG. 2) is formed in the region ahead of the vehicle. The low beam lamp 2 receives a signal instructing it to form a low beam light distribution pattern from the light distribution controlling device 8 and forms a low beam light distribution pattern in the region ahead of the host vehicle.

It is to be noted that the structure of the low beam lamp 2 is not limited to the one described above, and any known structures can be adopted. For example, the shade member 16 that forms a cutoff line may be of a shutter type in which a shade plate moves back and forth with respect to the optical axis. The low beam lamp 2 does not have to include the reflector 14 or the projection lens 18.

The first light distribution variable lamp 4 is capable of illuminating the region ahead of the vehicle with a visible light beam L1 of a variable intensity distribution. The first light distribution variable lamp 4 is supported on the lamp body by a known coupling mechanism (not shown). The first light distribution variable lamp 4 is capable of varying, independently of each other, the illuminance of light illuminating a plurality of individual regions arrayed in the region ahead. The first light distribution variable lamp 4 receives information instructing on a first light distribution pattern from the light distribution controlling device 8 and emits a visible light beam L1 having an intensity distribution corresponding to the first light distribution pattern. Thus, the first light distribution pattern is formed ahead of the host vehicle.

The first light distribution variable lamp 4 according to the present embodiment includes a light source array. The light source array includes a plurality of light sources arrayed in a matrix and a circuit board capable of adjusting the light of the light sources independently of each other. Preferred examples of such a light source include a semiconductor light-emitting element, such as an LED, an LD, or an organic or inorganic EL light source. The number of the light sources, that is, the resolving power (resolution) of the first light distribution variable lamp 4 is higher than the number of the light sources of the second light distribution variable lamp 6, that is, higher than the resolving power of the second light distribution variable lamp 6 and is, for example, from 1,000 pixels to 1,300,000 pixels. The resolution of a light distribution variable lamp means the number of the unit regions, of a light distribution pattern, whose illuminance can be varied independently of each other.

The second light distribution variable lamp 6 is capable of illuminating the region ahead of the vehicle with a visible light beam L2 of a variable intensity distribution. The second light distribution variable lamp 6 is supported on the lamp body by a known coupling mechanism (not shown). The second light distribution variable lamp 6 is capable of varying, independently of each other, the illuminance of light illuminating a plurality of individual regions arrayed in the region ahead. The second light distribution variable lamp 6 receives information instructing on a second light distribution pattern from the light distribution controlling device 8 and emits a visible light beam L2 having an intensity distribution corresponding to the second light distribution pattern. Thus, the second light distribution pattern is formed ahead of the host vehicle.

The second light distribution variable lamp 6 according to the present embodiment includes a light source unit constituted by a plurality of light sources arrayed in the horizontal direction and a circuit board capable of adjusting the light of the light sources independently of each other. Preferred examples of such a light source include a semiconductor light-emitting element, such as an LED, an LD, or an organic or inorganic EL light source. The resolving power (resolution) of the second light distribution variable lamp 6 is lower than the resolving power of the first light distribution variable lamp 4 and is, for example, from 10 pixels to 50 pixels.

It is to be noted that the structures of the first light distribution variable lamp 4 and the second light distribution variable lamp 6 are not limited to those described above, and any known structures can be adopted. For example, in order to form an illuminance distribution corresponding to a light distribution pattern, each light distribution variable lamp may include a pattern forming device of a matrix type, such as a digital mirror device (DMD) or a liquid-crystal device.

The light distribution controlling device 8 controls formation of light distribution patterns by the low beam lamp 2, the first light distribution variable lamp 4, and the second light distribution variable lamp 6. The light distribution controlling device 8 can be constituted by a digital processor and may, for example, be constituted by a combination of a microcomputer including a CPU and a software program or by a field-programmable gate array (FPGA), an application specific IC (ASIC), or the like. The light distribution control device 8 operates as the integrated circuit constituting itself executes a program stored in a memory.

Figure 2:
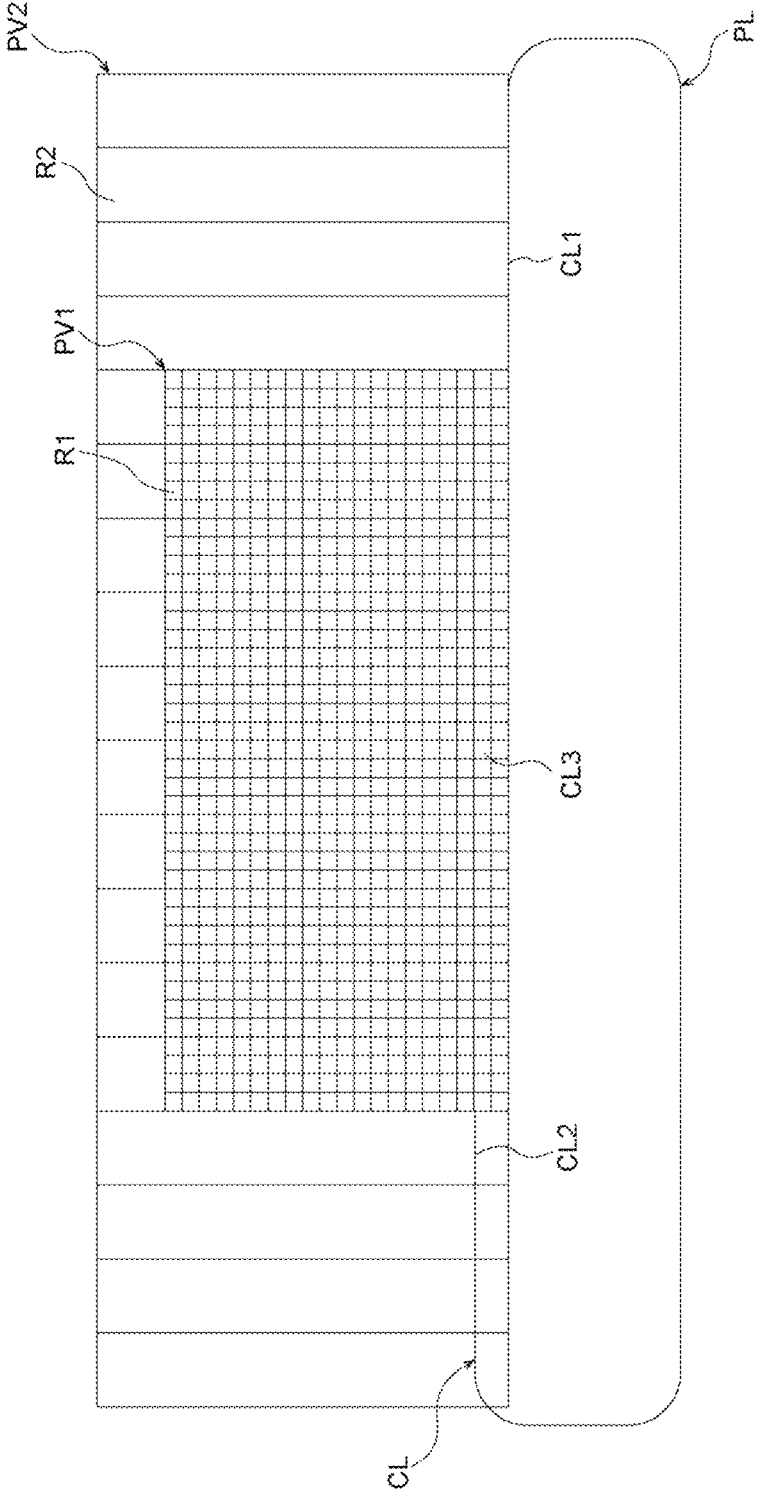
FIG. 2 is a schematic diagram showing light distribution patterns that the lamps form.

Now, shapes of light distribution patterns that the lamps form and control of forming the light distribution patterns performed by the light distribution controlling device 8 will be described. FIG. 2 is a schematic diagram showing light distribution patterns that the lamps form. FIG. 2 shows the maximum range in which the lamps can form light distribution patterns. A light distribution pattern is understood as a two-dimensional illuminance distribution of an illumination pattern that a lamp forms on an imaginary vertical screen ahead of the host vehicle. Note that FIG. 2 shows light distribution patterns for left-hand traffic.

The low beam lamp 2 can form a low beam light distribution pattern PL. The low beam light distribution pattern PL has a cutoff line CL at its upper end. The cutoff line CL includes a first partial cutoff line CL1, a second partial cutoff line CL2, and a third partial cutoff line CL3. The first partial cutoff line CL1 extends in the horizontal direction in the oncoming lane. The second partial cutoff line CL2 extends in the horizontal direction in the host vehicle's lane and at a position higher than the position of the first partial cutoff line CL1. The third partial cutoff line CL3 extends diagonally between the first partial cutoff line CL1 and the second partial cutoff line CL2 so as to connect the first partial cutoff line CL1 and the second partial cutoff line CL2.

The first light distribution variable lamp 4 can form a first light distribution pattern PV1 of a variable intensity distribution. FIG. 2 shows a first light distribution pattern PV1 formed when the first light distribution variable lamp 4 has turned on all the light sources in its light source array. The first light distribution pattern PV1 is a pattern that overlaps a region above the cutoff line CL and is formed, for example, in a region in which any known high beam light distribution patterns are to be formed. The first light distribution pattern PV1 has a structure in which a set of a plurality of first partial regions R1 are arrayed in a matrix. In one example, the light sources of the first light distribution variable lamp 4 are mapped one-to-one to the first partial regions R1. The illuminance of the first partial regions R1 can be adjusted independently of each other by adjusting the lighting state of the light sources.

The second light distribution variable lamp 6 can form a second light distribution pattern PV2 of a variable intensity distribution. FIG. 2 shows a second light distribution pattern PV2 formed when the second light distribution variable lamp 6 has turned on all the light sources in its light source unit. The second light distribution pattern PV2 is a pattern that overlaps a region above the cutoff line CL and is formed, for example, in a region that encompasses the first light distribution pattern PV1. The second light distribution pattern PV2 has a structure in which a set of a plurality of second partial regions R2 are arrayed in the width direction of the vehicle (in the horizontal direction). The second partial regions R2 each have, for example, a rectangular shape elongated in the vertical direction and are longer than the first light distribution pattern PV1 in the vertical direction. In one example, the light sources of the second light distribution variable lamp 6 are mapped one-to-one to the second partial regions R2. The illuminance of the second partial regions R2 can be adjusted independently of each other by adjusting the lighting state of the light sources.

The second light distribution pattern PV2 is projected so as to extend outside the first light distribution pattern PV1 in the width direction of the vehicle. Therefore, some of the second partial regions R2 overlap the first light distribution pattern PV1 in a center portion in the width direction of the vehicle, and the other second partial regions R2 lie outside the first light distribution pattern PV1 at the two ends in the width direction of the vehicle. Note that the shapes and the arrangement of the first partial regions R1 and the second partial regions R2 can be changed as appropriate along with, for example, the arrangement of the light sources in the first light distribution variable lamp 4 and the second light distribution variable lamp 6.

Figure 3A:
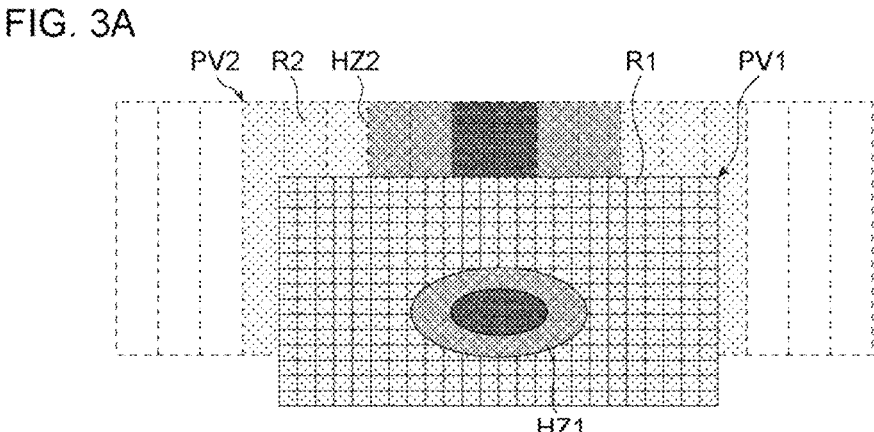
FIGS. 3A to 3C are schematic diagrams showing one example of light distribution control according to Embodiment 1.
Figure 3B:
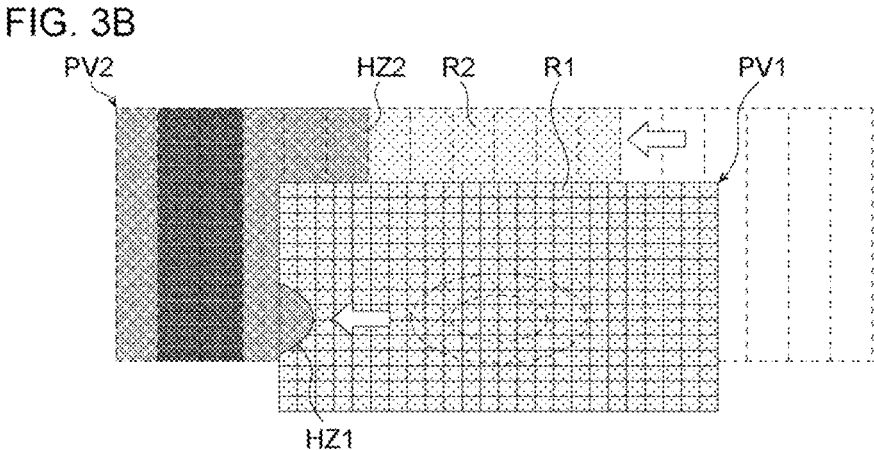
Figure 3C:
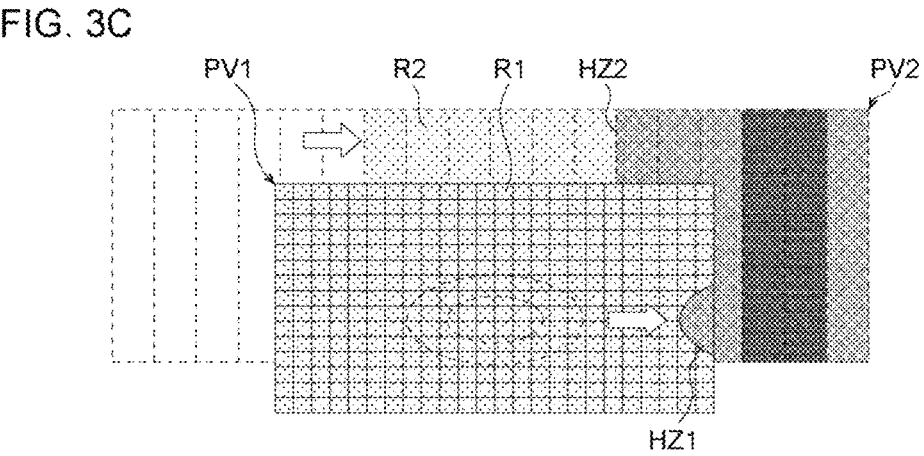

The light distribution controlling device 8 executes light distribution control as described below. FIGS. 3A to 3C are schematic diagrams showing one example of light distribution control according to Embodiment 1. FIG. 3A shows light distribution patterns formed when the steering angle is 0°. FIG. 3B shows light distribution patterns formed when the steering is turned to the left. FIG. 3C shows light distribution patterns formed when the steering is turned to the right. FIGS. 3A to 3C omit depicting a low beam light distribution pattern PL.

As shown in FIG. 3A, the light distribution controlling device 8 controls the first light distribution variable lamp 4 so as to form a first light distribution pattern PV1 having a first hot zone HZ1. The first hot zone HZ1 is a region having an illuminance (luminous intensity) higher than that of the remaining region in the first light distribution pattern PV1. The first hot zone HZ1 is formed in the part of the region ahead of the host vehicle where particularly high visibility is required. In one example, the light distribution controlling device 8 controls the first light distribution variable lamp 4 so as to form a first hot zone HZ1 above a cutoff line CL. When the steering angle is 0°, the first hot zone HZ1 is disposed at substantially the center in the width direction of the vehicle. The dimension of the first hot zone HZ1 in the vertical direction is, for example, no more than a half the dimension of the first light distribution pattern PV1 in the vertical direction, and the dimension of the first hot zone HZ1 in the horizontal direction is, for example, no more than a half the dimension of the first light distribution pattern PV1 in the horizontal direction.

Although FIG. 3A shows a first hot zone HZ1 of an elliptical shape, the shape of a first hot zone HZ1 is not limited to the one shown. Furthermore, although FIG. 3A shows a first hot zone HZ1 having such an illuminance gradient where the illuminance decreases gradually from the center toward the outer side, a first hot zone HZ1 does not have to have such an illuminance gradient.

The light distribution controlling device 8 controls the second light distribution variable lamp 6 so as to form a second light distribution pattern PV2 in which the second partial regions R2 that are located at the outer sides in the width direction of the vehicle and that do not overlap the first light distribution pattern PV1 have an illuminance of zero and in which the second partial regions R2 that overlap the first light distribution pattern PV1 have an illuminance of higher than zero. When the second light distribution pattern PV2 is constituted only by some of the second partial regions R2 and the second partial regions R2 that do not constitute the second light distribution pattern PV2, that is, the second partial regions R2 that have an illuminance of zero are moved in the width direction of the vehicle as described above, the second light distribution pattern PV2 can be swiveled in the range between the outer left side and the outer right side of the first light distribution pattern PV1.

The light distribution controlling device 8 controls the second light distribution variable lamp 6 so as to form a second hot zone HZ2 within the second light distribution pattern PV2. In one example, the light distribution controlling device 8 controls the second light distribution variable lamp 6 so as to form a second hot zone HZ2 above a cutoff line CL. The light distribution controlling device 8 controls the second light distribution variable lamp 6 so as to form the second hot zone HZ2 at a position where the second hot zone HZ2 overlaps the first hot zone HZ1 in the width direction of the vehicle. As mentioned above, the second partial regions R2 are longer than the first light distribution pattern PV1 in the vertical direction. Therefore, the second hot zone HZ2 is longer than the first hot zone HZ1 in the vertical direction.

The light distribution controlling device 8 then controls the first light distribution variable lamp 4 so as to swivel the first hot zone HZ1 within the first light distribution pattern PV1 (i.e., so as to displace the first hot zone HZ1 in the width direction of the vehicle), as shown in FIGS. 3B and 3C. For example, the light distribution controlling device 8 acquires a signal from a steering angle sensor 20 (steering sensor) provided in the vehicle (see FIG. 1). The light distribution controlling device 8 then swivels the first hot zone HZ1 in accordance with the output value of the steering angle sensor 20. This swiveling can displace the first hot zone HZ1 in the direction of turn of the vehicle and thus improve the visibility of where the vehicle turns to. Furthermore, swiveling the first hot zone HZ1 renders unnecessary a mechanism for swiveling the first light distribution variable lamp 4.

The light distribution controlling device 8 controls the second light distribution variable lamp 6 so as to swivel the second light distribution pattern PV2 in tandem with the swiveling of the first hot zone HZ1. Then, with the first hot zone HZ1 having reached an end of the first light distribution pattern PV1, the light distribution controlling device 8 controls the second light distribution variable lamp 6 so as to form the second light distribution pattern PV2 outside the first light distribution pattern PV1 where the first hot zone HZ1 has swiveled to. This configuration makes it possible to illuminate with light a broader range in the direction of turn of the vehicle and can improve the visibility for the driver. To "form a second light distribution pattern PV2 outside a first light distribution pattern PV1" means that at least a part of the second light distribution pattern PV2 is located outside the first light distribution pattern PV1. Therefore, the above expression encompasses a state in which a part of the second light distribution pattern PV2 overlaps the first light distribution pattern PV1 as shown in FIG. 3B or 3C.

The light distribution controlling device 8 controls the second light distribution variable lamp 6 so as to swivel the second hot zone HZ2 with it overlapping the first hot zone HZ1 within the range of the first light distribution pattern PV1. The light distribution controlling device 8 further controls the second light distribution variable lamp 6 so as to displace the second hot zone HZ2 further outward after the first hot zone HZ1 has reached an end of the first light distribution pattern PV1. For example, the light distribution controlling device 8 displaces the second hot zone HZ2 outside the end of the first light distribution pattern PV1 when a first hot zone HZ1 has reached the end of the first light distribution pattern PV1 and the steering angle has increased further. This configuration can further improve the visibility of where the vehicle turns to.

The light distribution controlling device 8 controls the first light distribution variable lamp 4 so as to turn off the first hot zone HZ1 that has reached an end of the first light distribution pattern PV1. In one example, the light distribution controlling device 8 turns off the first hot zone HZ1 that has reached an end of the first light distribution pattern PV1, in accordance with the steering angle. For example, the light distribution controlling device 8 gradually turns off the first hot zone HZ1 when the steering angle further increases after the first hot zone HZ1 has reached an end of the first light distribution pattern PV1, that is, when the second hot zone HZ2 moves to the outer side in the width direction of the vehicle from the end of the first light distribution pattern PV1. In the example shown in FIGS. 3B and 3C, the illuminance of the first hot zone HZ1 decreases from the center side in the width direction of the vehicle, and the first hot zone HZ1 is turned off gradually from the center side in the width direction of the vehicle.

This configuration can make a hot zone look as if it moves out of the region in which the first light distribution pattern PV1 is formed (into the region in which the second light distribution pattern PV2 is formed) in a combined light distribution pattern of the first light distribution pattern PV1 and the second light distribution pattern PV2 combined. This configuration makes it possible to guide the driver's line of sight to where the vehicle turns to. Herein, a first hot zone HZ1 may be turned off gradually as the illuminance across the entire first hot zone HZ1 is reduced uniformly.

As described above, the light distribution controlling device 8 according to the present embodiment controls the first light distribution variable lamp 4 and the second light distribution variable lamp 6 so as to swivel the first hot zone HZ1 within the first light distribution pattern PV1 and to form the second light distribution pattern PV2 outside the first light distribution pattern PV1 where the first hot zone HZ1 swivels to. In other words, one of the light distribution variable lamps swivels a hot zone, and the other light distribution variable lamp illuminates with light the region outside the range in which the hot zone is swiveled.

A combination of these two light distribution variable lamps in this manner allows for a lamp design of equipping one of the light distribution variable lamp with a high-definition light source array and equipping the other light distribution variable lamp with a low-definition light source unit. This design can improve the visibility for the driver while avoiding an increase in the size of the light source array.

The light distribution controlling device 8 controls the second light distribution variable lamp 6 so as to swivel the second light distribution pattern PV2 in tandem with the swiveling of the first hot zone HZ1. The light distribution controlling device 8 controls the second light distribution variable lamp 6 so as to swivel the second hot zone HZ2 with it overlapping the first hot zone HZ1 within the range of the first light distribution pattern PV1 and to displace the second hot zone HZ2 further outward after the first hot zone HZ1 has reached an end of the first light distribution pattern PV1. The light distribution controlling device 8 controls the first light distribution variable lamp 4 so as to turn off the first hot zone HZ1 that has reached the end of the first light distribution pattern PV1. The control above can further improve the visibility for the driver. In addition, the control above can guide the driver's line of sight to the region where he or she needs to pay attention to.

Embodiment 2

Figure 4A:
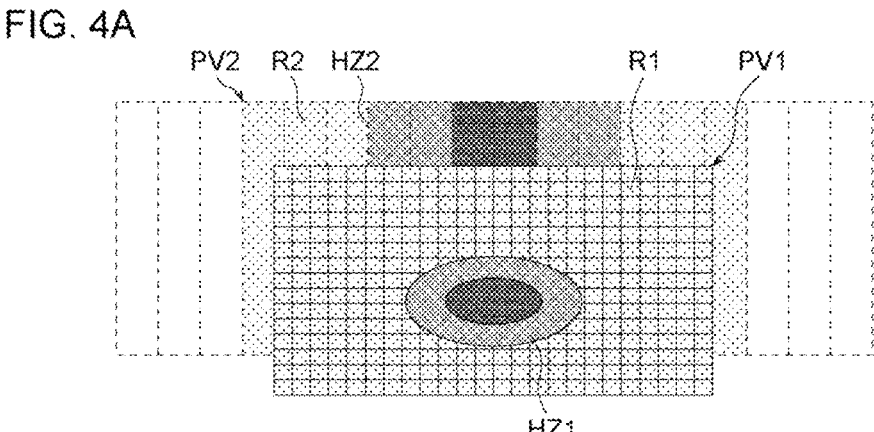
FIGS. 4A to 4C are schematic diagrams showing one example of light distribution control according to Embodiment 2.
Figure 4B:
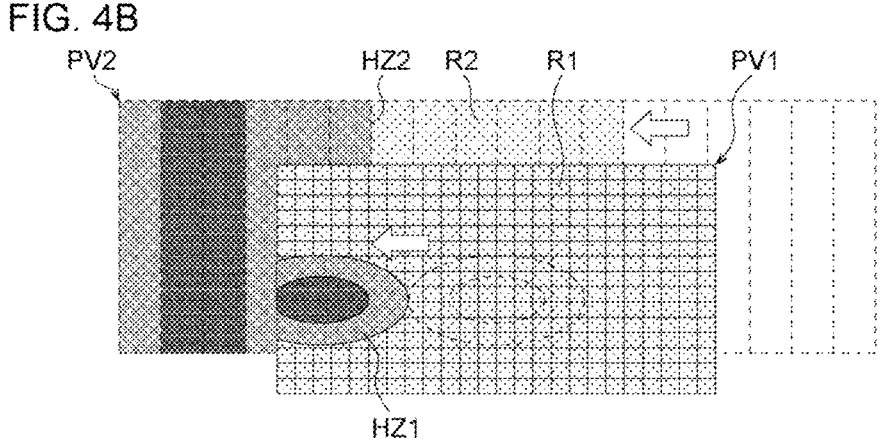
Figure 4C:
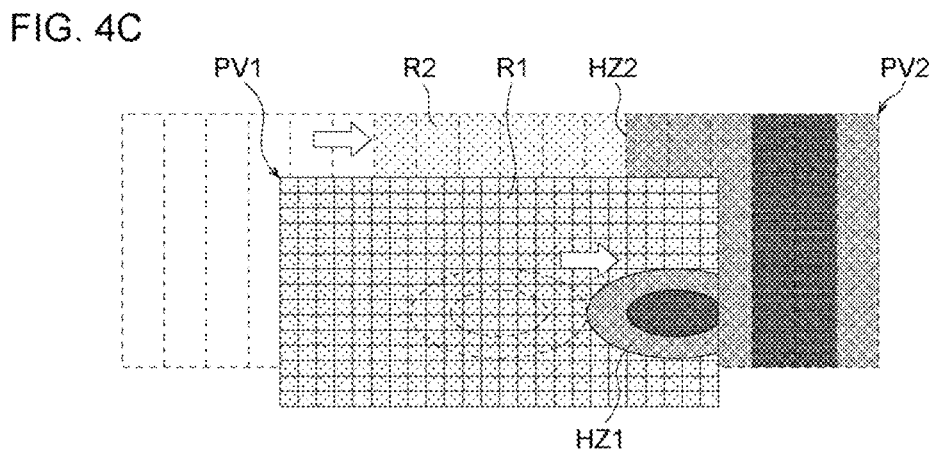

Embodiment 2 has a configuration identical to the configuration of Embodiment 1 except for the content of control by the light distribution control device 8. The present embodiment will be described below with the description centered on its configuration that differs from the configuration of Embodiment 1, and description of the configurations that are common to both embodiments will be simplified or omitted. FIGS. 4A to 4C are schematic diagrams showing one example of light distribution control according to Embodiment 2. FIG. 4A shows light distribution patterns formed when the steering angle is 0°. FIG. 4B shows light distribution patterns formed when the steering is turned to the left. FIG. 4C shows light distribution patterns formed when the steering is turned to the right. FIGS. 4A to 4C omit depicting a low beam light distribution pattern PL.

As shown in FIG. 4A, the light distribution controlling device 8 controls the first light distribution variable lamp 4 so as to form a first light distribution pattern PV1 having a first hot zone HZ1. The light distribution controlling device 8 controls the second light distribution variable lamp 6 so as to form a second light distribution pattern PV2 with only some of the second partial regions R2. This configuration makes it possible to displace the second light distribution pattern PV2 in the range between the outer left side and the outer right side of the first light distribution pattern PV1. The light distribution controlling device 8 controls the second light distribution variable lamp 6 so as to form a second hot zone HZ2 within the second light distribution pattern PV2. The second hot zone HZ2 is formed at a position where the second hot zone HZ2 overlaps the first hot zone HZ1 in the width direction of the vehicle.

The light distribution controlling device 8 then controls the first light distribution variable lamp 4 so as to swivel the first hot zone HZ1 within the first light distribution pattern PV1, as shown in FIGS. 4B and 4C. The light distribution controlling device 8 controls the second light distribution variable lamp 6 so as to swivel the second light distribution pattern PV2 in tandem with the swiveling of the first hot zone HZ1. Then, with the first hot zone HZ1 having reached an end of the first light distribution pattern PV1, the light distribution controlling device 8 controls the second light distribution variable lamp 6 so as to form the second light distribution pattern PV2 outside the first light distribution pattern PV1 where the first hot zone HZ1 has swiveled to.

The light distribution controlling device 8 controls the second light distribution variable lamp 6 so as to swivel the second hot zone HZ2 with it overlapping the first hot zone HZ1 within the range of the first light distribution pattern PV1. The light distribution controlling device 8 further controls the second light distribution variable lamp 6 so as to displace the second hot zone HZ2 further outward after the first hot zone HZ1 has reached the end of the first light distribution pattern PV1.

The light distribution controlling device 8 according to the present embodiment controls the first light distribution variable lamp 4 so as to maintain the first hot zone HZ1 that has reached the end of the first light distribution pattern PV1. As the first hot zone HZ1 remains being formed even after the second hot zone HZ2 has moved outside the first light distribution pattern PV1, a broader region ahead of the host vehicle can be illuminated brightly through a combination of the first hot zone HZ1 and the second hot zone HZ2. This configuration can provide the driver with a sense of comfort. When there is a large difference between the maximum illuminance of the first light distribution variable lamp 4 and the maximum illuminance of the second light distribution variable lamp 6, turning off the first hot zone HZ1 may cause the driver of the host vehicle to feel visually disturbed. Therefore, maintaining the first hot zone HZ1 can keep the driver from feeling visually disturbed.

Embodiment 3

Figure 5A:
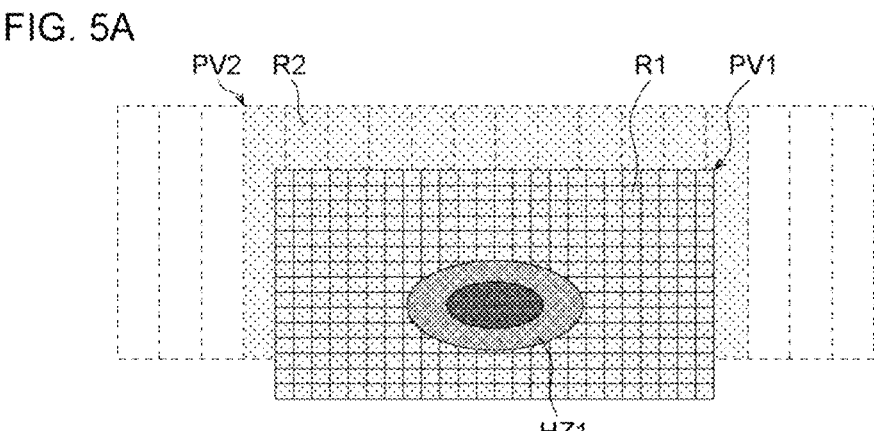
FIGS. 5A to 5C are schematic diagrams showing one example of light distribution control according to Embodiment 3.
Figure 5B:
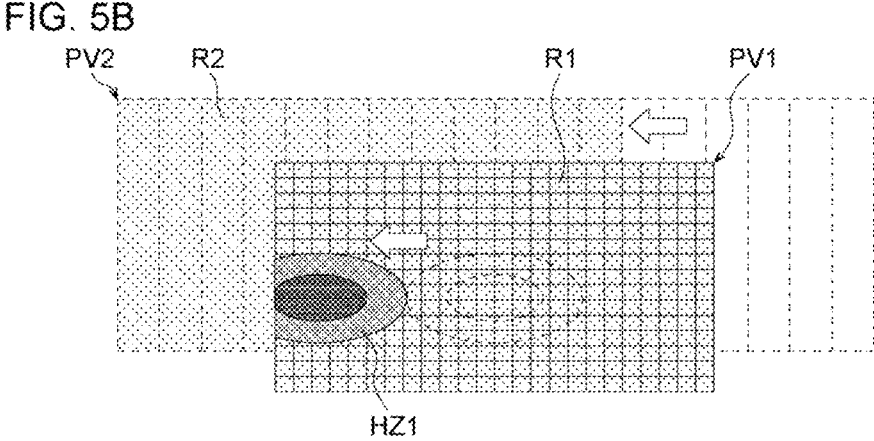
Figure 5C:
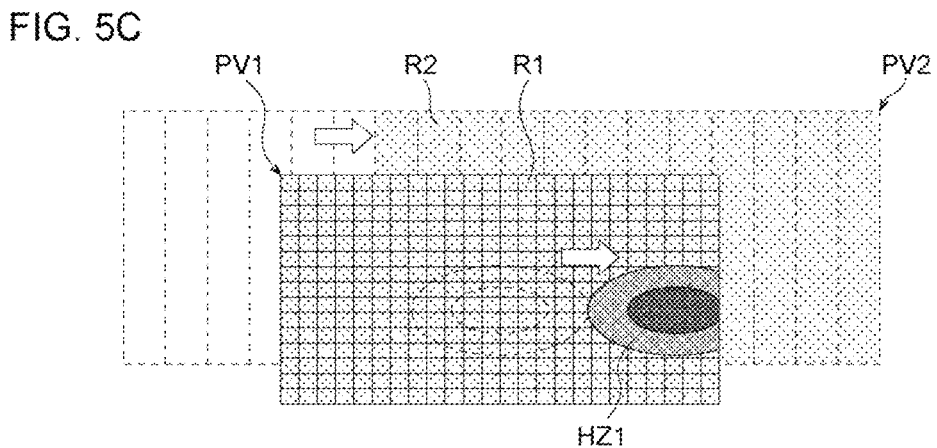

Embodiment 3 has a configuration identical to the configuration of Embodiment 1 except for the content of control by the light distribution control device 8. The present embodiment will be described below with the description centered on its configuration that differs from the configuration of Embodiment 1, and description of the configurations that are common to both embodiments will be simplified or omitted. FIGS. 5A to 5C are schematic diagrams showing one example of light distribution control according to Embodiment 3. FIG. 5A shows light distribution patterns formed when the steering angle is 0°. FIG. 5B shows light distribution patterns formed when the steering is turned to the left. FIG. 5C shows light distribution patterns formed when the steering is turned to the right. FIGS. 5A to 5C omit depicting a low beam light distribution pattern PL.

As shown in FIG. 5A, the light distribution controlling device 8 controls the first light distribution variable lamp 4 so as to form a first light distribution pattern PV1 having a first hot zone HZ1. The light distribution controlling device 8 controls the second light distribution variable lamp 6 so as to form a second light distribution pattern PV2 with only some of the second partial regions R2. This configuration makes it possible to displace the second light distribution pattern PV2 in the range between the outer left side and the outer right side of the first light distribution pattern PV1. The second light distribution pattern PV2 according to the present embodiment does not include a second hot zone HZ2 and has an illuminance uniform across the entire second light distribution pattern PV2.

The light distribution controlling device 8 then controls the first light distribution variable lamp 4 so as to swivel the first hot zone HZ1 within the first light distribution pattern PV1, as shown in FIGS. 5B and 5C. The light distribution controlling device 8 controls the second light distribution variable lamp 6 so as to swivel the second light distribution pattern PV2 in tandem with the swiveling of the first hot zone HZ1. Then, with the first hot zone HZ1 having reached an end of the first light distribution pattern PV1, the light distribution controlling device 8 controls the second light distribution variable lamp 6 so as to form the second light distribution pattern PV2 outside the first light distribution pattern PV1 where the first hot zone HZ1 has swiveled to. The light distribution controlling device 8 according to the present embodiment controls the first light distribution variable lamp 4 so as to maintain the first hot zone HZ1 that has reached the end of the first light distribution pattern PV1.

Embodiment 4

Figure 6A:
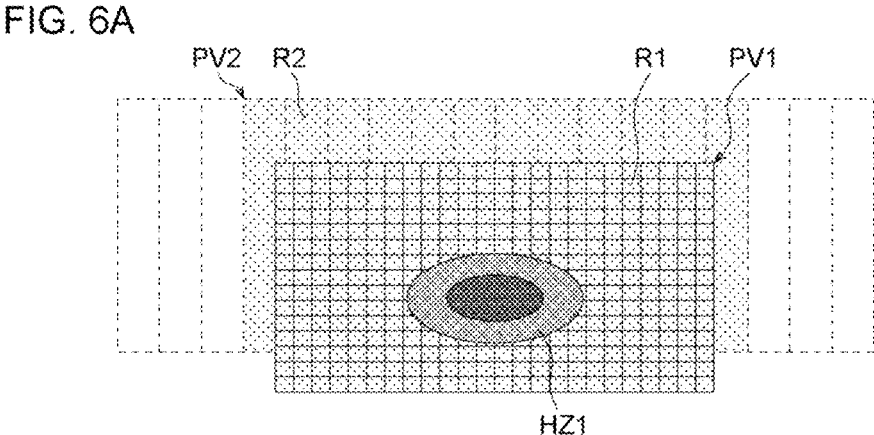
FIGS. 6A to 6C are schematic diagrams showing one example of light distribution control according to Embodiment 4.
Figure 6B:
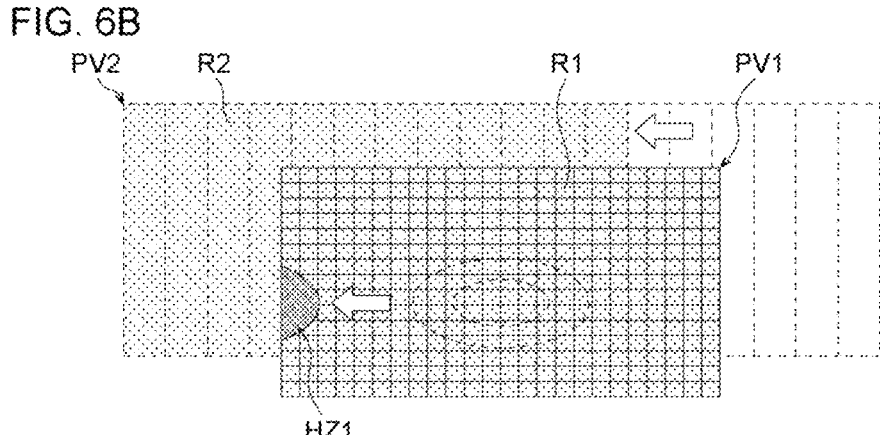
Figure 6C:
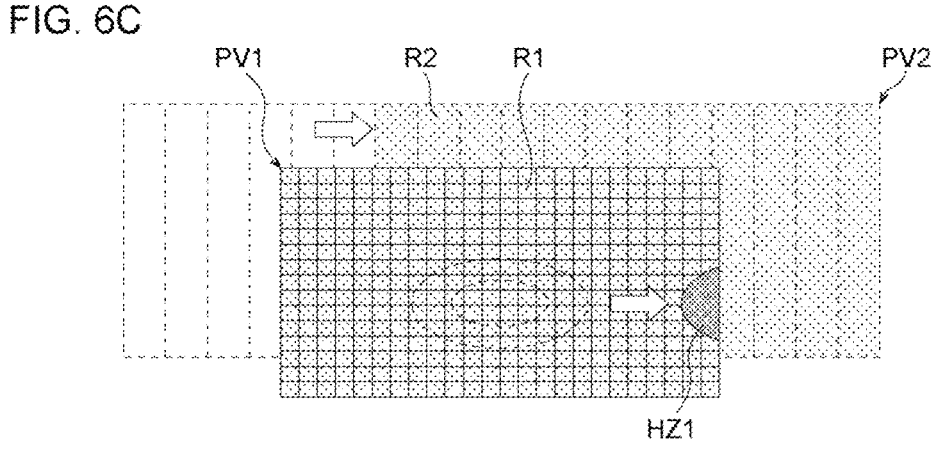

Embodiment 4 has a configuration identical to the configuration of Embodiment 1 except for the content of control by the light distribution control device 8. The present embodiment will be described below with the description centered on its configuration that differs from the configuration of Embodiment 1, and description of the configurations that are common to both embodiments will be simplified or omitted. FIGS. 6A to 6C are schematic diagrams showing one example of light distribution control according to Embodiment 4. FIG. 6A shows light distribution patterns formed when the steering angle is 0°. FIG. 6B shows light distribution patterns formed when the steering is turned to the left. FIG. 6C shows light distribution patterns formed when the steering is turned to the right. FIGS. 6A to 6C omit depicting a low beam light distribution pattern PL.

As shown in FIG. 6A, the light distribution controlling device 8 controls the first light distribution variable lamp 4 so as to form a first light distribution pattern PV1 having a first hot zone HZ1. The light distribution controlling device 8 controls the second light distribution variable lamp 6 so as to form a second light distribution pattern PV2 with only some of the second partial regions R2. This configuration makes it possible to displace the second light distribution pattern PV2 in the range between the outer left side and the outer right side of the first light distribution pattern PV1. The second light distribution pattern PV2 according to the present embodiment does not include a second hot zone HZ2 and has an illuminance uniform across the entire second light distribution pattern PV2.

The light distribution controlling device 8 then controls the first light distribution variable lamp 4 so as to swivel the first hot zone HZ1 within the first light distribution pattern PV1, as shown in FIGS. 6B and 6C. The light distribution controlling device 8 controls the second light distribution variable lamp 6 so as to swivel the second light distribution pattern PV2 in tandem with the swiveling of the first hot zone HZ1. Then, with the first hot zone HZ1 having reached an end of the first light distribution pattern PV1, the light distribution controlling device 8 controls the second light distribution variable lamp 6 so as to form the second light distribution pattern PV2 outside the first light distribution pattern PV1 where the first hot zone HZ1 has swiveled to.

The light distribution controlling device 8 according to the present embodiment controls the first light distribution variable lamp 4 so as to gradually turn off the first hot zone HZ1 when the steering angle further increases after the first hot zone HZ1 has reached the end of the first light distribution pattern PV1. In the example shown in FIGS. 6B and 6C, the first hot zone HZ1 that has reached the end of the first light distribution pattern PV1 is turned off gradually from the center side in the width direction of the vehicle. Herein, the first hot zone HZ1 may be turned off gradually as the illuminance across the entire first hot zone HZ1 is reduced uniformly.

Embodiment 5

Figure 7A:
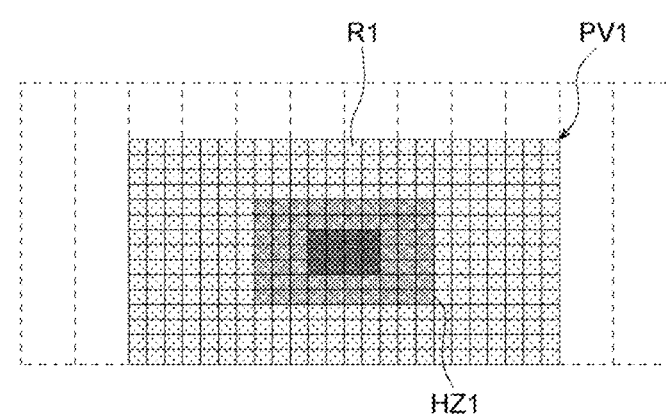
FIGS. 7A to 7C are schematic diagrams showing one example of light distribution control according to Embodiment 5.
Figure 7B:
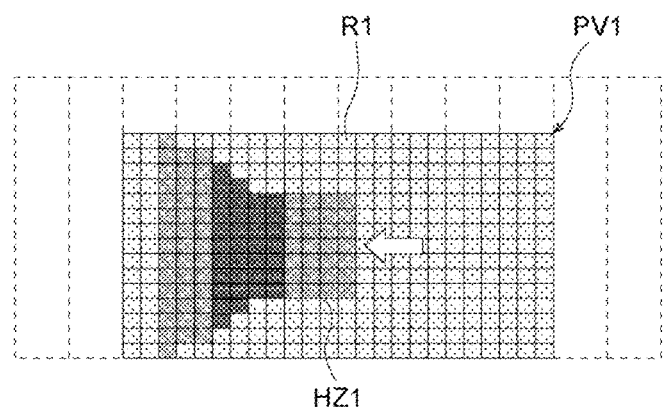
Figure 7C:
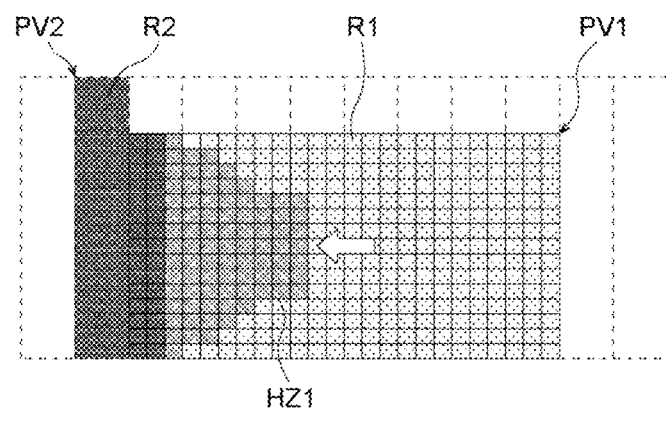

Embodiment 5 has a configuration identical to the configuration of Embodiment 1 except for the content of control by the light distribution control device 8. The present embodiment will be described below with the description centered on its configuration that differs from the configuration of Embodiment 1, and description of the configurations that are common to both embodiments will be simplified or omitted. FIGS. 7A to 7C are schematic diagrams showing one example of light distribution control according to Embodiment 5. FIG. 7A shows light distribution patterns formed when the steering angle is 0°. FIG. 7B shows light distribution patterns formed when the steering is turned to the left by a first angle. FIG. 7C shows light distribution patterns formed when the steering is turned to the left by a second angle greater than the first angle. FIGS. 7A to 7C omit depicting a low beam light distribution pattern PL.

As shown in FIG. 7A, the light distribution controlling device 8 controls the first light distribution variable lamp 4 so as to form a first light distribution pattern PV1 having a first hot zone HZ1. The light distribution controlling device 8 according to the present embodiment refrains from forming a second light distribution pattern PV2 until the first hot zone HZ1 reaches an end of the first light distribution pattern PV1.

The light distribution controlling device 8 controls the first light distribution variable lamp 4 so as to swivel the first hot zone HZ1 within the first light distribution pattern PV1 in accordance with the steering, as shown in FIG. 7B. Then, as shown in FIG. 7C, with the first hot zone HZ1 having reached the end of the first light distribution pattern PV1, the light distribution controlling device 8 controls the second light distribution variable lamp 6 so as to form a second light distribution pattern PV2 outside the first light distribution pattern PV1 where the first hot zone HZ1 has swiveled to. For example, the light distribution controlling device 8 controls the second light distribution variable lamp 6 so as to form the second light distribution pattern PV2 when the steering angle has increased further after the first hot zone HZ1 has reached the end of the first light distribution pattern PV1.

The second light distribution pattern PV2 formed in this case includes a second partial region R2 adjacent to the first light distribution pattern PV1 in the width direction of the vehicle and having an illuminance comparable to the illuminance of the first hot zone HZ1. The illuminance comparable to the illuminance of the first hot zone HZ1 is, for example, the illuminance the same as the illuminance of the first hot zone HZ1. Alternatively, this illuminance is an illuminance that, for example, allows a region having this illuminance to function as a hot zone in a combined light distribution pattern of the first light distribution pattern PV1 and the second light distribution pattern PV2 combined. Thus, the hot zone of the combined light distribution pattern moves from the region of the first light distribution pattern PV1 to the region of the second light distribution pattern PV2 while the steering angle increases.

As mentioned above, the second partial regions R2 are longer than the first light distribution pattern PV1 in the vertical direction. Therefore, when the hot zone of the combined light distribution pattern moves from the region of the first light distribution pattern PV1 to the region of the second light distribution pattern PV2, the size of the hot zone changes suddenly. This sudden change in the size of the hot zone may cause the driver to feel visually disturbed. The size of the hot zone also changes suddenly in a similar manner when the hot zone of the combined light distribution pattern moves back from the region of the second light distribution pattern PV2 to the region of the first light distribution pattern PV1 while the steering angle decreases, and this sudden change may cause the driver to feel visually disturbed.

In this respect, the light distribution controlling device 8 according to the present embodiment controls the first light distribution variable lamp 4 so as to expand the first hot zone HZ1 in the vertical direction as the first hot zone HZ1 approaches an end of the first light distribution pattern PV1, as shown in FIGS. 7B and 7C. This configuration can keep the size of the hot zone from changing suddenly when the hot zone of the combined light distribution pattern moves across the region of the first light distribution pattern PV1 and the region of the second light distribution pattern PV2. Accordingly, the visibility for the driver can be improved.

Herein, the light distribution controlling device 8 may control the second light distribution variable lamp 6 so as to swivel the second light distribution pattern PV2 having an illuminance uniform thereacross, as in Embodiment 3 or 4, until the first hot zone HZ1 reaches an end of the first light distribution pattern PV1. Even this case may cause the driver to feel visually disturbed when the hot zone moves across the region of the first light distribution pattern PV1 and the region of the second light distribution pattern PV2. Therefore, it is effective to expand the first hot zone HZ1 in the vertical direction as the first hot zone HZ1 approaches an end of the first light distribution pattern PV1.

Thus far, some embodiments according to the present invention have been described in detail. The embodiments described above merely illustrate some specific examples for implementing the present invention. The content of the embodiments does not limit the technical scope of the present invention, and a number of design changes, including modifications, additions, and deletions of constituent elements, can be made within the scope that does not depart from the sprit of the invention set forth in the claims. A new embodiment resulting from adding a design change has advantageous effects of the embodiments combined as well as the advantageous effects of the modification. With regard to the embodiments described above, expressions "according to the present embodiment," "in the present embodiment," and so on are added for emphasis to the content that can be subjected to such a design change, but a design change is also permitted on the content without these expressions. A desired combination of the constituent elements described above is also valid as an aspect of the present invention. Hatching added along a section in the drawings does not limit the material of such with hatching.

The invention according to the embodiments described above may be identified by the items indicated below.

[First Item]

A vehicle lamp system (1), comprising:

a first light distribution variable lamp (4) that forms, in a region ahead of a vehicle, a first light distribution pattern (PV1) having a first hot zone (HZ1);

a second light distribution variable lamp (6) that forms a second light distribution pattern (PV2) outside the first light distribution pattern (PV1) in a width direction of the vehicle; and a light distribution controlling device (8) that controls formation of light distribution patterns by the first light distribution variable lamp (4) and the second light distribution variable lamp (6), wherein the light distribution controlling device (8) controls the first light distribution variable lamp (4) and the second light distribution variable lamp (6) so as to swivel the first hot zone (HZ1) within the first light distribution pattern (PV1) and to form the second light distribution pattern (PV2) outside the first light distribution pattern (PV1) where the first hot zone (HZ1) swivels to.

[Second Item]

The vehicle lamp system (1) according to First Item, wherein the second light distribution pattern (PV2) can be swiveled in a range between an outer left side and an outer right side of the first light distribution pattern (PV1), and the light distribution controlling device (8) controls the second light distribution variable lamp (6) so as to swivel the second light distribution pattern (PV2) in tandem with the swiveling of the first hot zone (HZ1).

[Third Item]

The vehicle lamp system (1) according to Second Item, wherein the second light distribution pattern (PV2) includes a second hot zone (HZ2), and the light distribution controlling device (8) controls the second light distribution variable lamp (6) so as to swivel the second hot zone (HZ2) with the second hot zone (HZ2) overlapping the first hot zone (HZ1) within a range of the first light distribution pattern (PV1) and to displace the second hot zone (HZ2) further outward after the first hot zone (HZ1) has reached an end of the first light distribution pattern (PV1).

[Fourth Item]

The vehicle lamp system (1) according to any one of First Item to Third Item, wherein the light distribution controlling device (8) controls the first light distribution variable lamp (4) so as to turn off the first hot zone (HZ1) that has reached an end of the first light distribution pattern (PV1).

[Fifth Item]

The vehicle lamp system (1) according to any one of First Item to Fourth Item, wherein the first light distribution variable lamp (4) is capable of adjusting, independently of each other, illuminances of a plurality of first partial regions (R1) arrayed in a matrix, the second light distribution variable lamp (6) is capable of adjusting, independently of each other, illuminances of a plurality of second partial regions (R2) that are arrayed in the width direction of the vehicle and that are longer in a vertical direction than the first light distribution pattern (PV1), and the light distribution controlling device (8) controls the first light distribution variable lamp (4) and the second light distribution variable lamp (6) so as to expand the first hot zone (HZ1) in the vertical direction as the first hot zone (HZ1) approaches an end of the first light distribution pattern (PV1) and, with the first hot zone (HZ1) having reached the end, to form the second light distribution pattern (PV2) having a second partial region (R2) adjacent to the first light distribution pattern (PV1) and having an illuminance comparable to an illuminance of the first hot zone (HZ1).

[Sixth Item]

The vehicle lamp system (1) according to any one of First Item to Fifth Item, further comprising:

a low beam lamp (2) that forms a low beam light distribution pattern (PL) including a cutoff line (CL), wherein the second light distribution pattern (PV2) includes a second hot zone (HZ2), and the light distribution controlling device (8) controls the first light distribution variable lamp (4) and the second light distribution variable lamp (6) so as to form the first hot zone (HZ1) and the second hot zone (HZ2) above the cutoff line (CL).

[Seventh Item]

A light distribution controlling device (8) that controls formation of light distribution patterns by a first light distribution variable lamp (4) and a second light distribution variable lamp (6), the first light distribution variable lamp (4) forming, in a region ahead of a vehicle, a first light distribution pattern (PV1) having a first hot zone (HZ1), the second light distribution variable lamp (6) forming a second light distribution pattern (PV2) outside the first light distribution pattern (PV1) in a width direction of the vehicle, the light distribution controlling device (8) configured to:

control the first light distribution variable lamp (4) and the second light distribution variable lamp (6) so as to swivel the first hot zone (HZ1) within the first light distribution pattern (PV1) and to form the second light distribution pattern (PV2) outside the first light distribution pattern (PV1) where the first hot zone (HZ1) swivels to.

[Eighth Item]

A light distribution controlling method of controlling formation of light distribution patterns by a first light distribution variable lamp (4) and a second light distribution variable lamp (6), the first light distribution variable lamp (4) forming, in a region ahead of a vehicle, a first light distribution pattern (PV1) having a first hot zone (HZ1), the second light distribution variable lamp (6) forming a second light distribution pattern (PV2) outside the first light distribution pattern (PV1) in a width direction of the vehicle, the light distribution controlling method comprising:

controlling the first light distribution variable lamp (4) and the second light distribution variable lamp (6) so as to swivel the first hot zone (HZ1) within the first light distribution pattern (PV1) and to form the second light distribution pattern (PV2) outside the first light distribution pattern (PV1) where the first hot zone (HZ1) swivels to.

What is claimed is:

1. A vehicle lamp system, comprising:

a first light distribution variable lamp that forms, in a region ahead of a vehicle, a first light distribution pattern having a first hot zone;

a second light distribution variable lamp that forms a second light distribution pattern outside the first light distribution pattern in a width direction of the vehicle; and a light distribution controlling device that controls formation of light distribution patterns by the first light distribution variable lamp and the second light distribution variable lamp, wherein the light distribution controlling device controls the first light distribution variable lamp and the second light distribution variable lamp so as to swivel the first hot zone within the first light distribution pattern and to form the second light distribution pattern outside the first light distribution pattern where the first hot zone swivels to, the second light distribution pattern is configured to be swiveled in a range between an outer left side and an outer right side of the first light distribution pattern, and the light distribution controlling device controls the second light distribution variable lamp so as to swivel the second light distribution pattern in tandem with the swiveling of the first hot zone.

2. The vehicle lamp system according to claim 1, wherein the second light distribution pattern includes a second hot zone, and the light distribution controlling device controls the second light distribution variable lamp so as to swivel the second hot zone with the second hot zone overlapping the first hot zone within a range of the first light distribution pattern and to displace the second hot zone further outward after the first hot zone has reached an end of the first light distribution pattern.

3. The vehicle lamp system according to claim 2, wherein the light distribution controlling device controls the first light distribution variable lamp so as to turn off the first hot zone that has reached an end of the first light distribution pattern.

4. The vehicle lamp system according to claim 3, wherein the first light distribution variable lamp is configured to adjust, independently of each other, illuminances of a plurality of first partial regions arrayed in a matrix, the second light distribution variable lamp is configured to adjust, independently of each other, illuminances of a plurality of second partial regions that are arrayed in the width direction of the vehicle and that are longer in a vertical direction than the first light distribution pattern, and the light distribution controlling device controls the first light distribution variable lamp and the second light distribution variable lamp so as to expand the first hot zone in the vertical direction as the first hot zone approaches an end of the first light distribution pattern and, with the first hot zone having reached the end, to form the second light distribution pattern having a second partial region adjacent to the first light distribution pattern and having an illuminance comparable to an illuminance of the first hot zone.

5. The vehicle lamp system according to claim 3, further comprising:
a low beam lamp that forms a low beam light distribution pattern including a cutoff line, wherein
the second light distribution pattern includes a second hot zone, and
the light distribution controlling device controls the first light distribution variable lamp and the second light distribution variable lamp so as to form the first hot zone and the second hot zone above the cutoff line.

6. The vehicle lamp system according to claim 2, wherein the first light distribution variable lamp is configured to adjust, independently of each other, illuminances of a plurality of first partial regions arrayed in a matrix, the second light distribution variable lamp is configured to adjust, independently of each other, illuminances of a plurality of second partial regions that are arrayed in the width direction of the vehicle and that are longer in a vertical direction than the first light distribution pattern, and the light distribution controlling device controls the first light distribution variable lamp and the second light distribution variable lamp so as to expand the first hot zone in the vertical direction as the first hot zone approaches an end of the first light distribution pattern and, with the first hot zone having reached the end, to form the second light distribution pattern having a second partial region adjacent to the first light distribution pattern and having an illuminance comparable to an illuminance of the first hot zone.

7. The vehicle lamp system according to claim 1, wherein the light distribution controlling device controls the first light distribution variable lamp so as to turn off the first hot zone that has reached an end of the first light distribution pattern.

8. The vehicle lamp system according to claim 7, wherein the first light distribution variable lamp is configured to adjust, independently of each other, illuminances of a plurality of first partial regions arrayed in a matrix, the second light distribution variable lamp is configured to adjust independently of each other, illuminances of a plurality of second partial regions that are arrayed in the width direction of the vehicle and that are longer in a vertical direction than the first light distribution pattern, and
the light distribution controlling device controls the first light distribution variable lamp and the second light distribution variable lamp so as to expand the first hot zone in the vertical direction as the first hot zone approaches an end of the first light distribution pattern and, with the first hot zone having reached the end, to form the second light distribution pattern having a second partial region adjacent to the first light distribution pattern and having an illuminance comparable to an illuminance of the first hot zone.

9. The vehicle lamp system according to claim 7, further comprising:
a low beam lamp that forms a low beam light distribution pattern including a cutoff line, wherein
the second light distribution pattern includes a second hot zone, and
the light distribution controlling device controls the first light distribution variable lamp and the second light distribution variable lamp so as to form the first hot zone and the second hot zone above the cutoff line.

10. The vehicle lamp system according to claim 1, wherein
the first light distribution variable lamp is configured to adjust, independently of each other, illuminances of a plurality of first partial regions arrayed in a matrix, the second light distribution variable lamp is configured to adjust independently of each other, illuminances of a plurality of second partial regions that are arrayed in the width direction of the vehicle and that are longer in a vertical direction than the first light distribution pattern, and
the light distribution controlling device controls the first light distribution variable lamp and the second light distribution variable lamp so as to expand the first hot zone in the vertical direction as the first hot zone approaches an end of the first light distribution pattern and, with the first hot zone having reached the end, to form the second light distribution pattern having a second partial region adjacent to the first light distribution pattern and having an illuminance comparable to an illuminance of the first hot zone.

11. The vehicle lamp system according to claim 1, further comprising:
a low beam lamp that forms a low beam light distribution pattern including a cutoff line, wherein
the second light distribution pattern includes a second hot zone, and
the light distribution controlling device controls the first light distribution variable lamp and the second light distribution variable lamp so as to form the first hot zone and the second hot zone above the cutoff line.

12. A light distribution controlling device that controls formation of light distribution patterns by a first light distribution variable lamp and a second light distribution variable lamp, the first light distribution variable lamp forming, in a region ahead of a vehicle, a first light distribution pattern having a first hot zone, the second light distribution variable lamp forming a second light distribution pattern outside the first light distribution pattern in a width direction of the vehicle, the light distribution controlling device configured to:
control the first light distribution variable lamp and the second light distribution variable lamp so as to swivel the first hot zone within the first light distribution pattern and to form the second light distribution pattern outside the first light distribution pattern where the first hot zone swivels to, wherein the second light distribution pattern is configured to be swiveled in a range between an outer left side and an outer right side of the first light distribution pattern, and the light distribution controlling device controls the second light distribution variable lamp so as to swivel the second light distribution pattern in tandem with the swiveling of the first hot zone.

13. A light distribution controlling method of controlling formation of light distribution patterns by a first light distribution variable lamp and a second light distribution variable lamp, the first light distribution variable lamp forming, in a region ahead of a vehicle, a first light distribution pattern having a first hot zone, the second light distribution variable lamp forming a second light distribution pattern outside the first light distribution pattern in a width direction of the vehicle, the light distribution controlling method comprising:

controlling the first light distribution variable lamp and the second light distribution variable lamp so as to swivel the first hot zone within the first light distribution pattern and to form the second light distribution pattern outside the first light distribution pattern where the first hot zone swivels to, wherein the second light distribution pattern is configured to be swiveled in a range between an outer left side and an outer right side of the first light distribution pattern, and the light distribution controlling method controls the second light distribution variable lamp so as to swivel the second light distribution pattern in tandem with the swiveling of the first hot zone.

* * * * *